(12) United States Patent
Amit et al.

(10) Patent No.: US 10,013,201 B2
(45) Date of Patent: Jul. 3, 2018

(54) REGION-INTEGRATED DATA DEDUPLICATION

(71) Applicant: International Business Machines Corporation, Armonk, NY (US)

(72) Inventors: Jonathan Amit, Omer (IL); Aviv Caro, Modiin (IL); David D. Chambliss, Morgan Hill, CA (US); Joseph S. Glider, Palo Alto, CA (US); Chaim Koifman, Rishon Lezion (IL); Yosef Shatsky, Karnei Shomron (IL)

(73) Assignee: International Business Machines Corporation, Armonk, NY (US)

( * ) Notice: Subject to any disclaimer, the term of this patent is extended or adjusted under 35 U.S.C. 154(b) by 74 days.

(21) Appl. No.: 15/084,410

(22) Filed: Mar. 29, 2016

(65) Prior Publication Data

US 2017/0286002 A1 Oct. 5, 2017

(51) Int. Cl.
*G06F 12/00* (2006.01)
*G06F 3/06* (2006.01)
*G06F 17/30* (2006.01)

(52) U.S. Cl.
CPC .......... *G06F 3/0641* (2013.01); *G06F 3/0608* (2013.01); *G06F 3/0673* (2013.01); *G06F 17/30156* (2013.01)

(58) Field of Classification Search
None
See application file for complete search history.

(56) References Cited

U.S. PATENT DOCUMENTS

| 8,407,190 | B2 | 3/2013 | Prahlad et al. |
| 8,612,439 | B2 | 12/2013 | Prahlad et al. |
| 9,733,836 | B1 * | 8/2017 | Garg ............. G06F 3/0608 |
| 2012/0233417 | A1 | 9/2012 | Kalach et al. |
| 2014/0229452 | A1 | 8/2014 | Serita et al. |

(Continued)

FOREIGN PATENT DOCUMENTS

WO 2014136183 A1 9/2014

OTHER PUBLICATIONS

Jung et al., "Storage System Performace Enhancement Using Duplicated Data Managment Scheme," 2010, pp. 8-18.

(Continued)

*Primary Examiner* — Brian Peugh
(74) *Attorney, Agent, or Firm* — Zilka-Kotab, P.C.

(57) ABSTRACT

In one embodiment, a computer program product is configured for performing deduplication in conjunction with random read and write operations across a namespace divided into a plurality of disjoint regions. The computer program product includes a computer readable storage medium having program instructions embodied therewith, where the computer readable storage medium is not a transitory signal per se. The program instructions are executable by a computer to cause the computer to perform a method including: maintaining a metadata structure for each of the plurality of disjoint regions via the respective region manager(s) of the plurality of disjoint regions, each metadata structure comprising metadata indicating a physical storage location of one or more data chunks associated with the respective region; and performing, by the computer, a deduplicated write operation of a first data chunk in a first region of the plurality of disjoint regions.

20 Claims, 5 Drawing Sheets

(56) References Cited

U.S. PATENT DOCUMENTS

2014/0340778 A1    11/2014  Hana et al.
2015/0039568 A1*   2/2015  Noronha ............... G06F 3/0641
                                                            707/690
2016/0224589 A1*   8/2016  Chai ................. G06F 17/30156

OTHER PUBLICATIONS

IBM, "Distributed Data Deduplication Using Storage Agents," IP.com, Apr. 15, 2008, pp. 1-3.
Ghosh et. al, "Scalable Data Deduplication using Similarity Matching and In-Memory Indexes," IP.com, Apr. 16, 2013, pp. 1-5.
Anonymous, "Method and System for Data De-Duplication in Two-Stages," IP.com, Jun. 14, 2012, pp. 1-5.
Amit et al., U.S. Appl. No. 15/950,058, filed Apr. 10, 2018.

* cited by examiner

REGION-INTEGRATED DATA DEDUPLICATION

BACKGROUND

The present invention relates to data storage, and more specifically, this invention relates to data deduplication in a primary storage environment.

Storage systems which store large amounts of data sparsely written within a virtual namespace can partition the namespace into regions, each region being managed as a non-overlapping portion of the namespace. As an example, a block storage system may provision many volumes, each volume having an address space of many gigabytes (GBs). Similarly, each volume may include a plurality of regions, and a region may span 1-100 megabytes (MBs) within the volume. Thus, each volume is partitioned into multiple regions, each managing data stored in their own namespace.

Furthermore, in a primary storage system which is dominated by complex read and write data accesses of relatively small size (e.g. 4 KB or 64 KB), performance is often a key requirement and therefore persistent metadata utilized to service data requests must be primarily referenced while in fast-access memory. In conventional storage systems, it is not always possible to keep all metadata needed to efficiently manage the entire namespace in fast-access memory, as the amount of metadata necessary for such management may exceed the available memory.

The amount of metadata necessary for efficient management of a namespace may also increase in systems employing data deduplication to maximize the amount of available storage in the system. Data deduplication generally involves the identification of duplicate (triplicate, etc.) data portions, e.g. on different volumes or regions within the namespace, and reduction of the amount of storage consumed by freeing the storage space associated with all but one (or a relatively small number in cases where redundancy is desirable) copy of the data. To maintain consistency and provide access to the data, references such as pointers, etc. may be implemented to direct access requests to the single retained copy.

While deduplication effectively increases available storage compared to retaining a plurality of redundant duplicates, the technique requires additional metadata to manage the references pointing from the duplicated location to the retained data location.

In addition, primary storage systems are distinct from backup storage systems in which conventional deduplication techniques are employed, in that the size of the data portions used for detecting presence of duplicates is much less than that used for deduplication in backup storage systems. This further increases the amount of metadata necessary to manage the storage system, exacerbating the impact on overall system performance.

This is especially the case for primary storage systems which, distinct from backup storage systems, must perform deduplication as data arrives rather than periodically according to a deduplication schedule. In addition, for primary storage systems performance is largely measured according to input/output throughput, and when coupled with the relatively small data portion size used to detect duplicates, the need to identify duplicates at time of arrival (e.g. receipt of a write request) is a significant and detrimental impact on system performance.

Accordingly, efficiently managing the metadata in fast-access memory is of great significance, particularly for primary storage systems for which conventional deduplication techniques are not suitable. It would therefore be beneficial to provide techniques, systems, and corresponding computer program products for efficiently managing deduplication metadata in the context of primary storage systems.

SUMMARY

In one embodiment, a computer program product is configured for performing deduplication in conjunction with random read and write operations across a namespace divided into a plurality of disjoint regions, each region of the namespace being managed by a region manager. The computer program product includes a computer readable storage medium having program instructions embodied therewith, where the computer readable storage medium is not a transitory signal per se. The program instructions are executable by a computer to cause the computer to perform a method including: maintaining, by the computer, a metadata structure for each of the plurality of disjoint regions via the respective region manager(s) of the one or more of the plurality of disjoint regions, each metadata structure comprising metadata indicating a physical storage location of one or more data chunks associated with the respective region; and performing, by the computer, a deduplicated write operation of a first data chunk in a first region of the plurality of disjoint regions. The deduplicated write operation comprises: consulting, by a first region manager of the first region, a duplicate chunk finder in response to the first region manager receiving a write request corresponding to the first data chunk; determining, using at least the duplicate chunk finder, whether one or more of the plurality of disjoint regions other than the first region comprises a second data chunk identical in content to the first data chunk; and in response to determining one or more of the plurality of disjoint regions other than the first region comprises the second data chunk, establishing by the first region manager a reference from the first data chunk and/or an address corresponding to the first data chunk to the second data chunk.

In another embodiment, a computer-implemented method is configured for performing deduplication in conjunction with random read and write operations across a namespace divided into a plurality of disjoint regions, each region of the namespace being managed by a region manager. The method includes: maintaining a metadata structure for each of the plurality of disjoint regions via the respective region manager(s) of the one or more of the plurality of disjoint regions, each metadata structure comprising metadata indicating a physical storage location of one or more data chunks associated with the respective region; and performing a deduplicated write operation of a first data chunk in a first region of the plurality of disjoint regions. The deduplicated write operation includes: consulting, by a first region manager of the first region, a duplicate chunk finder in response to the first region manager receiving a write request corresponding to the first data chunk; determining, using at least the duplicate chunk finder, whether one or more of the plurality of disjoint regions other than the first region comprises a second data chunk identical in content to the first data chunk; and in response to determining one or more of the plurality of disjoint regions other than the first region comprises the second data chunk, establishing by the first region manager a reference from the first data chunk and/or an address corresponding to the first data chunk to the second data chunk.

In still another embodiment, a deduplicating storage system is configured to perform random read and write operations across a namespace. The system includes: a processor and logic integrated with and/or executable by the processor, the logic being configured to cause the processor to perform a method. The method includes: maintaining a metadata structure for each of the plurality of disjoint regions via the respective region manager(s) of the one or more of the plurality of disjoint regions, each metadata structure comprising metadata indicating a physical storage location of one or more data chunks associated with the respective region; and performing a deduplicated write operation of a first data chunk in a first region of the plurality of disjoint regions. The deduplicated write operation includes: consulting, by a first region manager of the first region, a duplicate chunk finder in response to the first region manager receiving a write request corresponding to the first data chunk; determining, using at least the duplicate chunk finder, whether one or more of the plurality of disjoint regions other than the first region comprises a second data chunk identical in content to the first data chunk; and in response to determining one or more of the plurality of disjoint regions other than the first region comprises the second data chunk, establishing by the first region manager a reference from the first data chunk and/or an address corresponding to the first data chunk to the second data chunk.

Other aspects and embodiments of the present invention will become apparent from the following detailed description, which, when taken in conjunction with the drawings, illustrate by way of example the principles of the invention.

DETAILED DESCRIPTION

Figure 1:
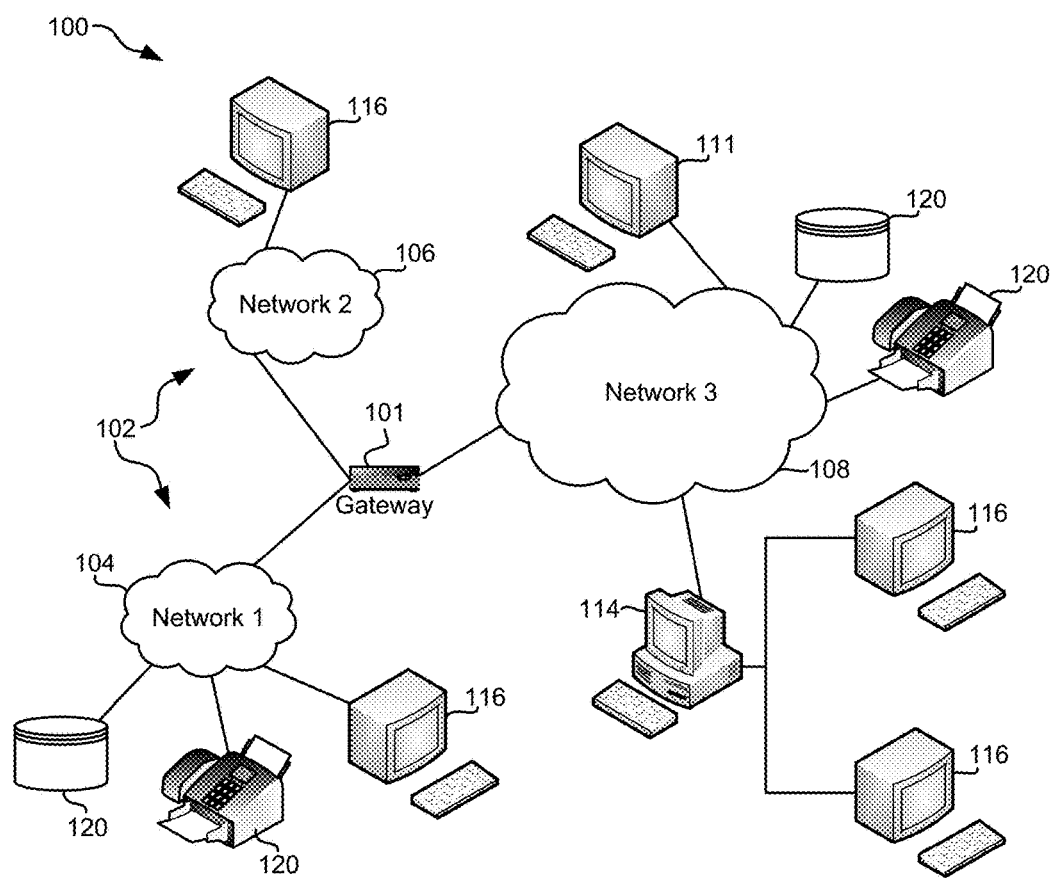
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for efficient management of metadata in the context of data deduplication, particularly for primary storage system environments.

In one general embodiment, a computer program product is configured for performing deduplication in conjunction with random read and write operations across a namespace divided into a plurality of disjoint regions, each region of the namespace being managed by a region manager. The computer program product includes a computer readable storage medium having program instructions embodied therewith, where the computer readable storage medium is not a transitory signal per se. The program instructions are executable by a computer to cause the computer to perform a method including: maintaining, by the computer, a metadata structure for each of the plurality of disjoint regions via the respective region manager(s) of the one or more of the plurality of disjoint regions, each metadata structure comprising metadata indicating a physical storage location of one or more data chunks associated with the respective region; and performing, by the computer, a deduplicated write operation of a first data chunk in a first region of the plurality of disjoint regions. The deduplicated write operation comprises: consulting, by a first region manager of the first region, a duplicate chunk finder in response to the first region manager receiving a write request corresponding to the first data chunk; determining, using at least the duplicate chunk finder, whether one or more of the plurality of disjoint regions other than the first region comprises a second data chunk identical in content to the first data chunk; and in response to determining one or more of the plurality of disjoint regions other than the first region comprises the second data chunk, establishing by the first region manager a reference from the first data chunk and/or an address corresponding to the first data chunk to the second data chunk.

In another general embodiment, a computer-implemented method is configured for performing deduplication in conjunction with random read and write operations across a namespace divided into a plurality of disjoint regions, each region of the namespace being managed by a region manager. The method includes: maintaining a metadata structure for each of the plurality of disjoint regions via the respective region manager(s) of the one or more of the plurality of disjoint regions, each metadata structure comprising metadata indicating a physical storage location of one or more data chunks associated with the respective region; and performing a deduplicated write operation of a first data chunk in a first region of the plurality of disjoint regions. The deduplicated write operation includes: consulting, by a first region manager of the first region, a duplicate chunk finder in response to the first region manager receiving a write request corresponding to the first data chunk; determining, using at least the duplicate chunk finder, whether one or more of the plurality of disjoint regions other than the first region comprises a second data chunk identical in content to the first data chunk; and in response to determining one or more of the plurality of disjoint regions other than the first region comprises the second data chunk, establishing by the first region manager a reference from the first data chunk and/or an address corresponding to the first data chunk to the second data chunk.

In still another general embodiment, a deduplicating storage system is configured to perform random read and write operations across a namespace. The system includes: a processor and logic integrated with and/or executable by the processor, the logic being configured to cause the processor to perform a method. The method includes: maintaining a metadata structure for each of the plurality of disjoint regions via the respective region manager(s) of the one or more of the plurality of disjoint regions, each metadata structure comprising metadata indicating a physical storage location of one or more data chunks associated with the respective region; and performing a deduplicated write operation of a first data chunk in a first region of the plurality of disjoint regions. The deduplicated write operation includes: consulting, by a first region manager of the first region, a duplicate chunk finder in response to the first region manager receiving a write request corresponding to the first data chunk; determining, using at least the duplicate chunk finder, whether one or more of the plurality of disjoint regions other than the first region comprises a second data chunk identical in content to the first data chunk; and in response to determining one or more of the plurality of disjoint regions other than the first region comprises the second data chunk, establishing by the first region manager a reference from the first data chunk and/or an address corresponding to the first data chunk to the second data chunk.

General Storage, Network, and Computing Concepts

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
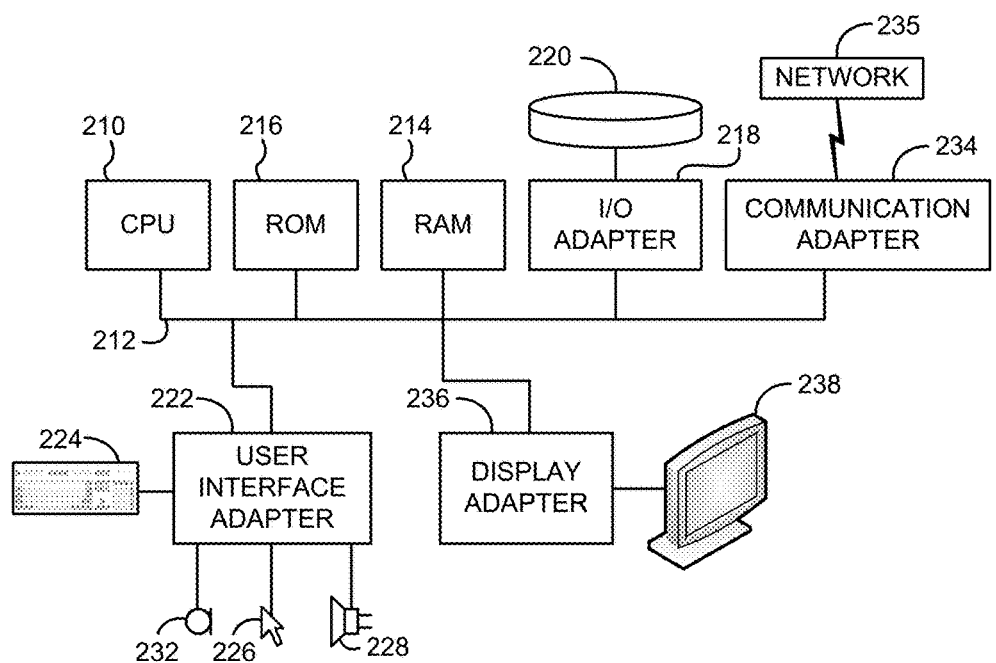
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
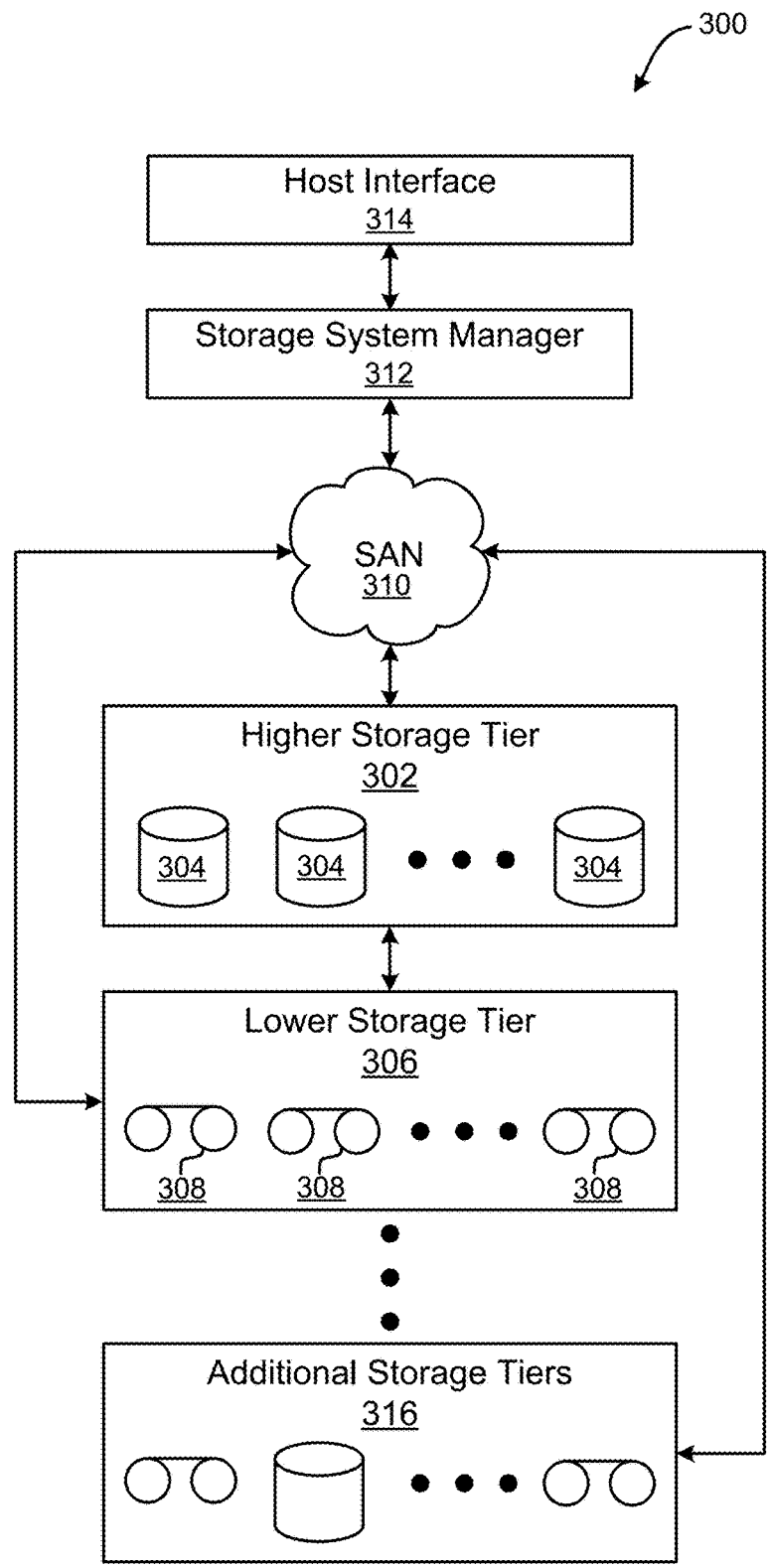
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. Although the present inventive concepts do not require a tiered storage environment to realize the advantages and benefits disclosed herein, in various exemplary embodiments a tiered storage system is an appropriate environment in which to implement said inventive concepts. As will be understood by a person having ordinary skill in the art upon reading the present descriptions, preferred embodiments convey particular advantage when implementing the instant disclosures on a primary storage system.

With continuing reference to FIG. 3, the storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Data Deduplication

Data deduplication is typically employed for backup storage systems, which are generally oriented toward stream processing of backups and restores, and much different from primary storage access patterns. For instance, primary storage access generally includes a mixture of smaller reads and writes, often not sequential, and often including updates of virtual data.

In addition, performance requirements for backup storage systems are different than primary storage, e.g. backup storage systems typically focus more on streaming bandwidth whereas primary storage performance often focuses on the number input/output operations per second (IOPS) and latency in addition to aggregate throughput. Further still, backup storage systems that deduplicate generally put primary emphasis on deduplication effectiveness whereas primary storage systems generally put primary emphasis on performance.

Therefore, the metadata structures supporting backup storage systems are generally quite different than for primary storage systems. Although deduplicating backup storage systems might keep some deduplication-detection metadata in memory for faster access, the information contained in that metadata is generally just enough to enable a page-in of a dense subset of deduplication-detection metadata pertaining to data most closely resembling data being currently ingested (e.g. new version of a file as in 'extreme binning' paper, or new daily backup for a user that has already backed up previous versions of the data), and the dense deduplication-detection metadata paged in from disk is only used to deduplicate the stream or file currently being ingested.

This structure is not optimal for primary storage, where it is more desirable to be able to deduplicate against any other data already in the system, rather than just a portion of existing data identified as likely to be a previous version of, or close resemblance to, an existing object within the virtual namespace.

In addition, applying a conventional deduplication technique to a primary storage system, e.g. by performing traditional deduplication when the storage system is not actively in use, is associated with a disadvantageous lag due to the need to process the full storage system capacity to locate and reduce/remove duplicate data portions. As a result, such systems must include a sufficient amount of additional storage to accommodate the lag between writing duplicate data and performing the deduplication process, which may take days or weeks for storage system architectures commonly employed at the time of the present invention.

For instance, in a scenario where deduplication may accomplish a 20:1 reduction in storage consumption (e.g. in a storage system serving a plurality of highly similar virtual machines), writing data in a duplicative manner can result in approximately two weeks' worth of activity consuming the equivalent of about a year's worth of activity if the same data were written in a deduplicated manner. In other words, under the present scenario employing the presently disclosed inventive concepts may reduce storage consumption by a significant factor, and therefore significantly reduce the amount of storage resources necessary to store effectively the same amount of information within the system.

Accordingly, a novel metadata structure and deduplication technique is desirable to improve the function of primary storage systems and similar environments with distinct performance requirements such as those set forth above.

Implementing the presently disclosed inventive concepts will advantageously achieve this improvement by reducing the amount of storage space on a primary storage system necessary to provide access to a particular data portion by significantly reducing or avoiding duplication common to conventional storage systems.

In addition, by employing the presently disclosed inventive concepts, I/O load and latency associated with deduplication can be reduced, and throughput of the storage system may be improved relative to implementing a conventional data deduplication scheme on a primary storage system. In various approaches, these performance benefits are conveyed by using a special metadata structure, in accordance with the inventive embodiments set forth herein.

In general, a data deduplication system, technique, etc. as disclosed herein includes four fundamental functionalities. First, the system includes a mechanism by which duplicate data may be detected. Second, the system is capable of establishing reference(s) between duplicate data (e.g. included in or associated with a new write request) and a "master" data portion/record matching the duplicate data. Third, the system includes a technique for tracking references to determine when a particular data portion is no longer needed (e.g. when no references rely on the master data portion, and/or when the only reference relying on the master portion is within the same region). Finally, the system includes the capability to read deduplicated data, e.g. by routing read requests directed to the location previously reserved for the duplicated data to instead read the master data portion/record. Of course, the system, technique, etc. may include additional and/or alternative functionalities as disclosed herein in any suitable combination or permutation, in various embodiments.

In one embodiment, data are stored in structures known as regions, and each region is managed as a log structured storage system. Accordingly, the external face of the storage system is based on a namespace by which the user can reference data. Exemplary embodiments of such storage systems include block-based storage systems, object storage, etc. as would be understood by a person having ordinary skill in the art upon reading the present descriptions.

The region orientation has advantages for performance in typical workloads, as well as advantages for speed and for compression effectiveness because of locality of data access. In general when accessing data it is not possible to fit all the necessary metadata in memory. Accordingly, a scheme by which to choose what metadata to have in memory and what metadata to push out of memory is important. This includes not only paging in on a read only basis but also persisting the updated copies of metadata. Advantageously, the region orientation takes in to account the locality of data access and leverages the fact that upon a first access to a given region there is a very high likelihood that of many more accesses to the same region soon thereafter.

Accordingly, the region-based approach improves the function of the system itself with respect to read/write operations by amortizing the cost of paging in, and ultimately paging out, (e.g. modified) metadata. When coupled with the presently disclosed inventive metadata structure, these improvements to performance are amplified to great advantage and system overhead reduced while enabling deduplication at time of write for primary storage systems and similar architectures.

Implementing traditional deduplication on primary storage systems and similar architectures, as noted above, presents challenges that effectively render the approach undesirable. For instance, implementing a deduplication layer in front or behind the write operations requires repeating a lot of work of finding metadata and using metadata, which may double the size of metadata, incurring cost in physical storage. In addition, read/write performance is degraded because there exist two independent places where metadata fetches are required. In a layered system additional fetch operations per read may be imposed, further degrading performance of the system.

Similarly, implementing deduplication on individual regions conveys practically little to no benefit relative to embodiments in which no deduplication is performed whatsoever, and attempting to implement traditional deduplication schemes to a primary storage system presents the problems noted above. Accordingly, implementing deduplication in a primary storage environment presents unique challenges requiring unique solutions such as the presently disclosed inventive region-integrated deduplication and novel metadata structure-based techniques.

In one embodiment, the metadata structure facilitates data deduplication for primary storage system architectures based at least in part on use of a region-integrated data deduplication approach that is applied at the time of write. The metadata structure may comprise a dictionary specifying chunks (e.g. ~4-6 kilobyte (KB) data portions) of data stored while servicing write requests directed to a particular region. For instance, in one approach the metadata structure may be a persistent metadata structure.

Preferably, each chunk of data stored by the region is identified within the dictionary by a short name relating to the content of the data, for example a 20-byte hash code calculated from the content of the chunk of data. Each dictionary entry also includes an indication of how many 'accessory' (both from within the region as well as from other regions) reference the data (the result of deduplication). Also, each region manager maintains a reference list of pointers to other regions where data referenced as a result of writes of chunks to this region is stored (or, as an alternate embodiment, a list of pointers to where data can be found, that was originally stored by another region but has been deduplicated with data in this region). In addition, the translation map correlating virtual namespace location to physical storage locations is augmented such that each namespace entry references an entry in the dictionary if the data is stored by the region, or to a reference list if the data was stored in another region, and therefore must be accessed via another region manager.

Accordingly, each region may include a metadata structure (e.g. dictionary) configured to specify chunks of data stored while servicing write requests to that region. The metadata structure is also preferably configured to be implemented in conjunction with a region manager that, in turn, is configured to manage the storage of data within the region. In various approaches, the metadata structure includes metadata regarding data stored within the region and/or metadata regarding data stored in other regions. The metadata for internally-stored data and externally-stored data may be maintained in separate dictionaries, or a single dictionary per region, in various embodiments.

Figure 4:
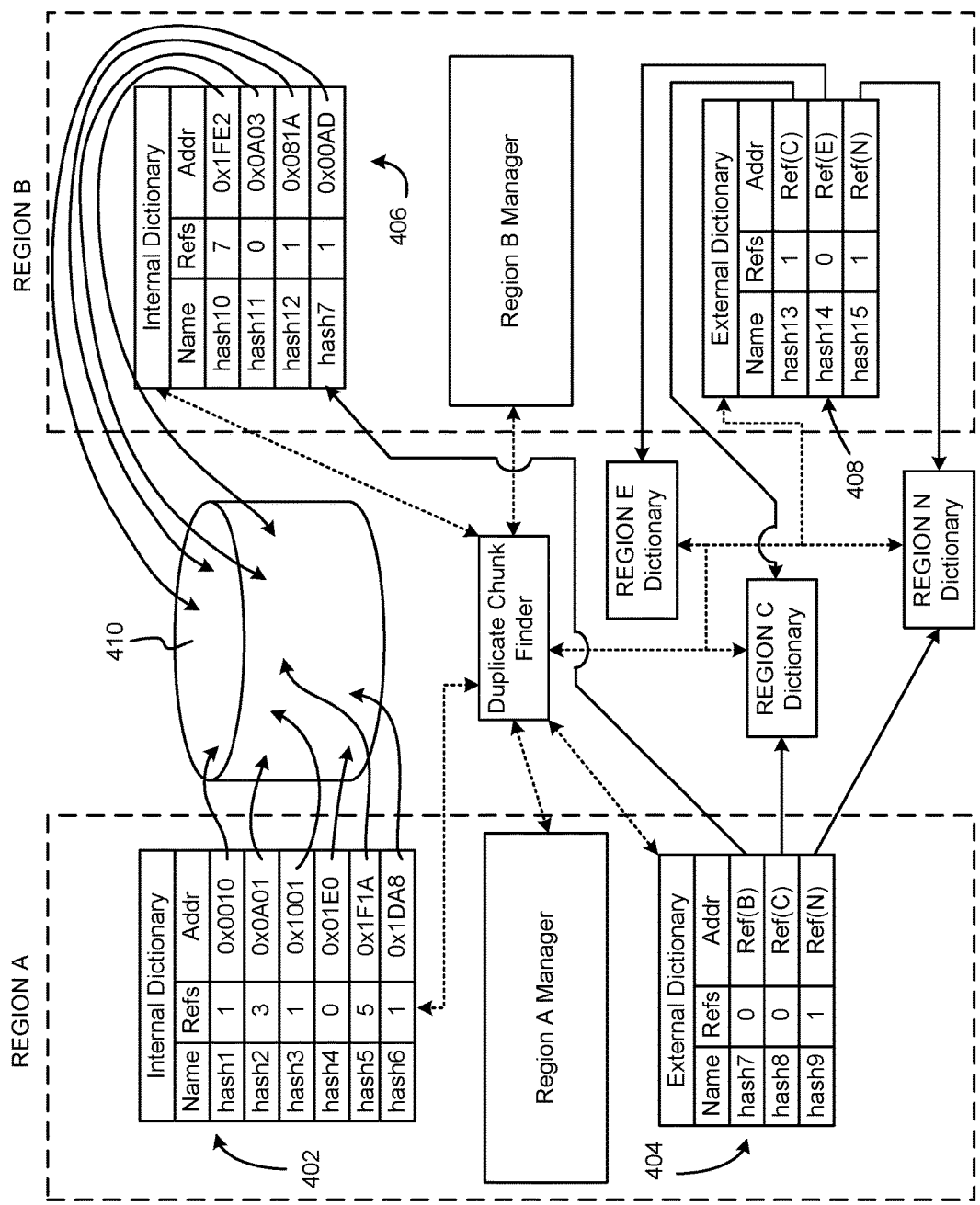
FIG. 4 depicts one embodiment of a region-integrated deduplication system.

For instance, and with reference to FIG. 4, a storage system includes a plurality of regions A . . . N, and each region includes a region manager configured to manage data storage, metadata associated with data storage, and I/O requests submitted to the region. Each region also includes one or more metadata structures, e.g. internal and/or external dictionaries. As shown in the embodiment of FIG. 4, each region includes an internal and an external dictionary, e.g. internal dictionaries 402, 406 for regions A and B respectively, and external dictionaries 404, 408 for regions A and B, respectively. Of course, in alternative embodiments the internal and external dictionaries may be encapsulated in a single metadata structure per region.

Regardless of the number of dictionaries or other metadata structures employed, each region maintains metadata regarding internally stored and externally stored data chunks. Preferably, each metadata structure includes a record for each data chunk stored in the region, and/or each data chunk upon which the region relies (e.g. via a reference to an externally stored data chunk). Each record includes metadata such as a unique key (Name column as shown in FIG. 4) identifying the data chunk to which the metadata relate, a counter (Refs column in FIG. 4) indicating a number of references relying on the data chunk to which the metadata relate, and one or more of an address (Addr column as shown in FIG. 4) corresponding to a physical storage location for the data chunk, e.g. on storage device 410, and/or a reference (Addr column as shown in FIG. 4) to an external region storing a deduplicated "master" data chunk.

In various embodiments, the unique key may include the aforementioned 20-byte hash calculated based on part or all of the content of the data chunk to which the metadata relate. Similarly, the counter may include any other suitable form of indicator for indicating that external references rely on the data chunk to which the metadata relate. The address and/or reference may include any suitable indicator of a storage location and/or reference as would be understood by a person having ordinary skill in the art upon reading the present descriptions.

In addition, and not shown in FIG. 4, the system preferably includes a virtual namespace map storing metadata corresponding to data chunks stored across the system as a whole, and including a plurality of records comprising a unique key and an indicator of the region in which the data chunk corresponding to the unique key is stored. Of course, other metadata as described herein and/or metadata as would be appreciated to be useful by a skilled artisan reading the present disclosures may also be included in the virtual namespace map, according to various embodiments.

In addition to per-region metadata, a duplicate chunk finder is included, and is configured such that when new data is being written to a region, the region manager can determine whether the new data corresponds to content already existing in the system. Accordingly, metadata as described above are created upon receipt of a write request to the system (e.g. in the case of the virtual namespace map set forth above) and/or particular region (e.g. in the case of regional metadata structures), in preferred approaches. These metadata may be employed by the duplicate chunk finder to determine whether duplicate chunks exist in the storage system, and take corresponding action, e.g. by performing a write if no duplicates exist (e.g. via a non-deduplicated write as discussed herein) or creating a reference to a preexisting duplicate data chunk (e.g. via a deduplicated write as discussed herein).

For purposes of this description, the duplicate chunk finder according to one embodiment represents any method of identifying whether there is a high likelihood of an existing chunk with the same content, and which region holds that chunk (e.g. a global dictionary of some or all of the short names of chunks stored in the system, each entry pointing to a region that stores the chunk).

Accordingly, the duplicate chunk finder referenced above may be implemented as the mechanism for detecting duplicate data. In more approaches, this mechanism may include any suitable duplicate detection technique, system, etc. as would be understood by a person having ordinary skill in the art upon reading the present descriptions. Importantly, however, the duplicate detection process of the presently disclosed inventive concepts is based on the metadata structures configured to specify chunks of data stored while servicing write requests to the region with which the metadata structure is associated.

For instance, the duplicate chunk finder may manage and determine the existence of a duplicate chunk in one or more regions based on comparing the unique key associated with a read/write request to unique keys stored in the metadata structures of various regions throughout the storage system. The duplicate chunk finder may accomplish this comparison with cooperation from region managers of the various regions, in multiple embodiments, and may also facilitate the creation or updating of references and associated metadata (e.g. counters, reference indicators as shown in FIG. 4) throughout the storage system in order to maintain accurate representations of data storage and management throughout the system.

In one embodiment, the detection mechanism/process includes a process for finding likely duplicates (or at least a reasonable chance of finding duplicates) and a process by which duplicate status is confirmed, coupled with a transaction that ensures the master data portion/record is not erased while a reference to it is created. In addition, the presence of the reference is recorded. For instance, the detection process may rely on a map translating virtual namespace data locations to physical storage locations. Of course, in additional embodiments any other suitable technique or mechanism configured to detect duplicates, deduplicate references, etc. may be employed without departing from the scope of the present disclosures.

Turning now to the implementation of the presently disclosed inventive concepts, according to various embodiments of read and write operations may include non-deduplicated write operations, non-deduplicated read operations, deduplicated write operations and deduplicated read operations. Preferably, each of these basic operations are managed on a region-by-region basis by a region manager or manager(s) associated with respective regions involved in the operation.

Non-Deduplicated Write

For non-deduplicated writes, according to embodiments of the presently disclosed inventive concepts, in general an incoming data chunk corresponding to a write request or write operation is routed to a region manager managing the region where the data chunk was written to, or is designated for writing (also referred to herein as the "receiving region"). The region manager calculates a short name for the data chunk, which in-turn is used to determine whether any matching chunks exist in that region, or other region(s) (also referred to herein as the "owning region"). As noted above, the determination is preferably performed at least in part using a duplicate finder. In the present scenario of a non-deduplicated write, no duplicate is located.

In response to determining no matching chunk exists in the region or other region(s), the region manager stores the data chunk, and records the short name of the data chunk and location of the data chunk (e.g. the address associated with the physical storage location where the data are stored) in the chunk dictionary. A reference is associated with the storage location, e.g. as a pointer in the virtual namespace map referring to the storage location.

Thereafter, the region manager provides the chunk information (e.g. short name, storage location, number of references pointing to the chunk, etc.) available to the duplicate finder for purposes of evaluating whether subsequent write requests match the presently written data chunk, again e.g. based on short name.

Deduplicated Write

On the other hand, a deduplicated write operation leverages additional functionality. As above for non-deduplicated write operations, the data chunk is routed to the region manager where the data were written to and/or to which the write request applies. The region manager also calculates a short name for the data chunk, and a duplicate finder determines whether any duplicate chunks exist in the region or other region(s). In the case of a deduplicated write, however, a match is located.

In response to determining the matching chunk exists, e.g. in another region, the region manager for the region where the data were written or to which the write request applies engages the region manager for the region where the matching chunk is located. The two region managers engage in a protocol to establish a reference from the recently written chunk (or location corresponding to the write request) to the matching chunk.

Optionally, in some embodiments the region manager managing the region where the matching chunk resides may reject the opportunity to establish a reference, e.g. based on access heuristics. For example, it may be disadvantageous for the receiving region manager to establish references with another region manager before determining that an opportunity exists with respect to the owning region manager to provide enough data to make it worthwhile to have paged the owner region manager metadata into memory.

The receiving region manager that received the written chunk preferably records a new entry in an associated local dictionary reference list (or as an optimization updates an existing entry if for the same chunk in the same other region), and records in its virtual namespace map a pointer to the reference list entry (or in an alternate embodiment, the physical location of the data as received from the region manager that owns the data). As described herein, "establishing a reference" includes making metadata changes that make operational the equivalence between the first address and the second chunk. Those metadata changes may, and preferably do, include changes that are made both in the metadata of the first region and in the metadata of the second region.

For instance, and with reference to FIG. 4, in preferred embodiments each region may maintain an internal dictionary (402, 406) and an external dictionary (e.g. 404, 408). The internal dictionary may include metadata indicating the identity of data chunks (e.g. based on a unique key generated from data chunk content), storage location of data chunks, and existence of references to data chunks managed by the particular region. The external dictionary may include metadata indicating the identity, existence of references, and referenced location of data chunks associated with other regions and managed by other region managers.

Also as a result, owning region manager that owns the matching chunk records a new reference to that chunk in the owning region manager's local dictionary. As an optimization, the recordation may be performed only the first time a first region references a specific data chunk in a specific second region.

By implementing the foregoing non-deduplicated write procedure, the presently disclosed inventive concepts advantageously maintains transactional integrity and avoids errors associated with race conditions for concurrent read/write operations.

For instance, a race condition may exist with respect to a write chunk which a receiving region determines is a duplicate (e.g. based on reference information reflected in the receiving region's associated local dictionary), but a concurrent write operation applied to the supposedly corresponding duplicate of the received write chunk releases, or overwrites, the supposedly corresponding duplicate in the owning region. In this event, the write chunk determined to be a duplicate would not be written, and instead a reference would be made to the owning region, but since the owning region has determined to overwrite or release the "master" copy, the reference would be broken and the data would be lost due to the race condition.

The presently disclosed inventive concepts avoid such race conditions in one embodiment by providing an "interlock" between regions that ensures data is appropriately preserved via the region-integrated approach to deduplication. In particular, since region managers are aware of dependencies by other region managers, the presently disclosed inventive concepts enable cross-region determination of whether data may be properly released, overwritten, etc. to maintain transactional integrity even in the event of concurrent operations seeking to take incompatible action with respect to a particular data chunk, storage location, etc.

In one approach, this integrity may take the form of a reference counter being maintained in the owning region's local dictionary, the counter indicating the number of internal and/or external region references to the corresponding data storage location, chunk, etc. Only when the counter indicates no external regions require access to the corresponding data storage location, chunk, etc. (or alternatively no references whatsoever exist with respect to the location, chunk, etc.) may the data be released, overwritten, or access thereto otherwise prevented.

In more embodiments, in addition to the counter a dictionary may include reference information indicating the particular regions relying on each reference reflected in the counter. In another approach, a master list of references may be separately maintained to provide awareness of references existing within the namespace.

Additionally and/or alternatively, in response to the foregoing race condition scenario, the owning region manager may indicate to the receiving region manager that the previously referenced data which has now been overwritten, released, etc. is no longer available for read, and instruct the receiving region manager to engage in a non-deduplicated write operation to restore the overwritten/released data to the namespace.

Non-Deduplicated Read

Turning now to non-deduplicated read operations, in preferred embodiments non-deduplicated read operations are performed in a substantially conventional manner, e.g. a read request corresponding to a data chunk is routed to a region manager, the region manager locates the data chunk in the virtual namespace translation map and/or local dictionary, and the region manager retrieves data from the storage location specified in the map and/or dictionary and distributes the retrieved data to the requesting entity (e.g. process, user, etc.)

Deduplicated Read

Deduplicated reads, on the other hand, preferably involve performing a process substantially as follows, in various embodiments. In general, a data chunk read request is routed to a region manager (which may or may not be storing the associated data chunk).

In one approach, the region manager, in response to receiving the read request, identifies a region that is storing the data, e.g. based on evaluating metadata residing in a local dictionary and/or virtual namespace map. For instance, in the event a "master" deduplicated data chunk is stored in a different region than the region managed by the region manager receiving the read request, the region manager may send a corresponding read request to the region storing the "master" deduplicated data chunk. Additionally and/or alternatively, the region manager may send a corresponding read request to the entity (e.g. physical storage device) storing the "master" deduplicated data chunk.

In response to receiving the corresponding read request from the region manager that received the original read request, the region manager for the region storing the data chunk retrieves the data chunk from the storage location (e.g. based on evaluating a local dictionary) and dispatches the retrieved data chunk to the region manager that received the original read request. Optionally, instead of (or in addition to) sending the data chunk to the region manager that received the original read request, the data chunk may be dispatched to the entity (e.g. process) that submitted the read request. In embodiments where the data chunk is sent to the region manager that received the original read request, that region manager preferably dispatches the data chunk to the entity that submitted the read request.

In further approaches, the region manager that received the read request may evaluate data access heuristics and based on a result of the evaluation, may store the data chunk in the region managed by the region manager rather than simply forwarding the data on to the entity that submitted the read request. For instance, if the data chunk is subject to at least a threshold number of read requests per a predetermined unit of time, it may be more efficient to simply store the data locally in the region rather than continue to submit corresponding read requests to other region manager(s). Although this approach may result in duplication of the data chunk, storing the data locally advantageously balances the speed and overhead associated with accessing the data against the storage usage efficiency of maintaining only a single copy of the data chunk within the storage system.

Advantageously, and particularly in embodiments where the region to which the read request was originally sent includes a reference to a second region where the data chunk subject to the read request is actually stored, each region manager may operate independently without disrupting other regions for the purposes of relocating data within the region. Data within the region that is not in use, (or equivalently storage resources not currently in use) may be reorganized using one or more garbage collection techniques, including any suitable garbage collection technique that would be appreciated by a skilled artisan upon reviewing the present disclosures.

Localized, region-based garbage collection is particularly advantageous in the context of the presently disclosed inventive concepts because individual region managers may uniquely possess and/or have unique access to indicia that relocation operations are scheduled, underway, complete, etc. and therefore manage read/write requests received from other region managers in a queued fashion to allow relocation and thus facilitate efficient, accurate access to data chunks stored by the region. Furthermore, individual region managers may perform local garbage collection in a more efficient manner than a global or cross-region garbage collection approach because a relatively small amount of metadata may be paged into memory, and overhead associated with communications between regions may be avoided, in preferred embodiments.

On the other hand, in scenarios where data is stored locally in the region receiving the read request, or where the metadata structure within the region directly specifies the physical storage location of the data to which the read request relates, the region manager preferably directly accesses and retrieves the data chunk from the physical storage device and provides the data chunk either to the process that submitted the read request, the region manager that received the read request, or both.

In various embodiments, a background process may manage the existence and association of references to data chunks in association with the aforementioned deduplicated read request operations. For instance, defunct references (e.g. in the event of a region storing data locally rather than continuing to forward read requests to the region owning the data chunk) may be detected and removed in a batched manner, in one embodiment.

In preferred approaches, in response to determining a data chunk is overwritten, the region manager may determine a previous version of the data chunk was deduplicated, in which case a reference to the deduplicated chunk is no longer necessary and may be removed from the regional metadata structure. Accordingly, if the chunk is no longer referred to, the space allocation previously associated therewith may be re-used.

Figure 5:
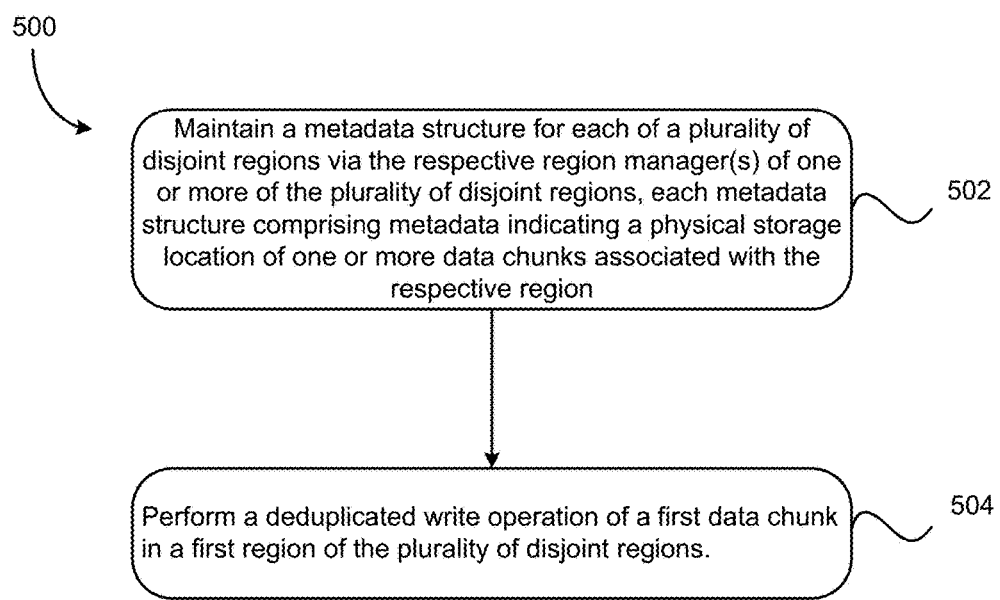
FIG. 5 is a flowchart of a method, according to one embodiment.

Now referring to FIG. 5, a flowchart of a method 500 is shown according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a primary storage system, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may be configured for performing deduplication in conjunction with random read and write operations across a namespace divided into a plurality of disjoint regions, each region of the namespace being managed by a region manager. Method 500 accordingly includes operation 502, where a metadata structure for each of the plurality of disjoint regions is maintained via the respective region manager(s) of the one or more of the plurality of disjoint regions, each metadata structure comprising metadata indicating a physical storage location of one or more data chunks associated with the respective region.

In addition, method 500 includes, in operation 504, performing a deduplicated write operation of a first data chunk in a first region of the plurality of disjoint regions. The deduplicated write operation includes consulting, by a first region manager of the first region, a duplicate chunk finder in response to the first region manager receiving a write request corresponding to the first data chunk; determining, using at least the duplicate chunk finder, whether one or more of the plurality of disjoint regions other than the first region comprises a second data chunk identical in content to the first data chunk; and in response to determining one or more of the plurality of disjoint regions other than the first region comprises the second data chunk: establishing by the first region manager a reference from the first data chunk to the second data chunk.

In one embodiment, a first region manager determines that the content of a first chunk directed to a first region is identical in content to a second chunk corresponding to a second region, and managed by a second region manager. The first region manager causes to be established a reference from a first address (associated with the arrival of the first chunk) to the second chunk. As described herein, "establishing a reference" includes making metadata changes that make operational the equivalence between the first address and the second chunk. Those metadata changes may, and preferably do, include changes that are made both in the metadata of the first region and in the metadata of the second region.

Accordingly, the metadata in the first region preferably is updated to record that the data for the first address can be found through the second region by referring to the name of the second chunk. This is illustrated in FIG. 4, in one embodiment, as an entry in the External Dictionary 404 of region A, taking region A as the first region. An entry with name "hash7" there references Region B, taking region B as the second region. The external dictionary entry is beneficial for performing a deduplicated read of the first address. The first region manager thus may consult the virtual namespace map and find there a pointer to the entry that points to Region B, for instance.

Similarly, the metadata in the second region is preferably updated to record that the second chunk is referenced from the first region. This is illustrated in FIG. 4 as part of the Refs field for the entry in the Internal Dictionary 406 of Region B. The external dictionary entry facilitates region B's manager to ensure that the second chunk is held in storage, even if a third chunk is later supplied in a write to the second virtual address originally associated with the second chunk.

The metadata change in the first region, according to the preferred embodiment, is a full recording of the reference, pointing specifically to the second region and the name of the region. The recording in the second region may have reduced information, because it does not necessarily record the identity of the first region; it may only increment the reference count. Accordingly, the reference is recorded in the first region's metadata, and the existence of the reference is recorded in the second region's metadata. In one embodiment, this is implemented via an owning region manager that owns the matching chunk recording a new reference to that chunk in the owning region manager's local dictionary Of course, in various embodiments method 500 may include any number of additional and/or alternative features, operations, or functionalities as described herein. For instance, in one embodiment each region manager is configured to service one or more of random read and/or random write operations directed to one or more of the plurality of disjoint regions via the respective region manager(s) of the one or more of the plurality of disjoint regions.

In yet another embodiment, determining whether the one or more of the plurality of disjoint regions other than the first region comprise the second data chunk is performed further using the respective region managers of the one or more of the plurality of disjoint regions.

The method 500 may also involve receiving a confirmation from at least one region manager of the one or more of the plurality of disjoint regions other than the first region that comprise the second data chunk.

The metadata structure for each region may include metadata indicating a number of regions having a reference to the one or more data chunks associated with the respective region; metadata indicating unique identifier of the one or more data chunks associated with the respective region; as well as (or in the alternative) metadata indicating a number references to the one or more data chunks associated with the respective region. Each unique identifier may be embodied in the form of a 20-byte hash based on content of the corresponding data chunk.

Implementing method 500 may also utilize a virtual namespace map. The virtual namespace map preferably includes one or more of: metadata indicating a unique key for each data chunk stored in the namespace; and metadata indicating a region to which each data chunk stored in the namespace belongs.

The method 500 may additionally and/or alternative include performing a deduplicated read operation directed to the namespace. The deduplicated read operation may, according to one embodiment be performed in response to the first region manager receiving a read request corresponding to the deduplicated read operation, and the deduplicated read operation may include: determining, by the first region manager, whether a reference to the second data chunk exists in the metadata structure of the first region; and in response to determining the reference to the second data chunk exists in the metadata structure of the first region, providing access to the second data chunk by a second region manager managing the region hosting the second data chunk.

Alternatively, the deduplicated read operation may include determining, by the first region manager, whether a reference to the second data chunk exists in the metadata structure of the first region; and in response to determining the reference to the second data chunk exists in the metadata structure of the first region, reading by the first region manager the second data chunk.

In one embodiment, establishing the reference to the second data chunk is performed only in response to a first instance of the determining one or more of the plurality of disjoint regions other than the first region comprises the second data chunk.

Additionally, the method 500 may include performing a non-deduplicated write of the first data chunk to the first region in response to determining none of the plurality of disjoint regions other than the first region comprises the second data chunk. The non-deduplicated write process may also involve creating a metadata record in the metadata structure of the first region in response to performing the non-deduplicated write of the first data chunk, the metadata record comprising at least a unique identifier corresponding to the first data chunk and a physical storage location corresponding to the first data chunk.

In various embodiments, each data chunk is characterized by a size in a region from about 4 KB to about 64 KB, a size in a region from about 4 KB to about 32 KB, a size in a region from about 4 KB to about 16 KB, a size in a region from about 4 KB to about 8 KB, or a size in a region from about 4 KB to about 6 KB.

Preferably, the namespace is implemented on a primary storage system rather than a secondary, tertiary, etc. storage system. Accordingly, the deduplication of data is preferably performed at the time of write, and writing involves performing random read/write operations as is common to primary storage systems at the time of the invention.

The foregoing descriptions have been provided in the context of a storage system implementing a block-based storage architecture. However, skilled artisans reading the present description will comprehend that the instant disclosures are also relevant to other storage architectures, particularly virtual storage such as object-based storage, cloud storage, etc. in various embodiments. Accordingly, the presently described inventive concepts may be employed on other storage architectures without departing from the scope of these disclosures.

The presently disclosed inventive concepts may be embodied as a system, a method, and/or a computer program product. The computer program product may include a computer readable storage medium (or media) having computer readable program instructions thereon for causing a processor to carry out aspects of the instant disclosure, in any combination or permutation.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product for performing deduplication in conjunction with random read and write operations across a namespace divided into a plurality of disjoint regions, each region of the namespace being managed by a region manager, the computer program product comprising a computer readable storage medium having program instructions embodied therewith, wherein the computer readable storage medium is not a transitory signal per se, the program instructions executable by a computer to cause the computer to perform a method comprising:
   maintaining, by the computer, a metadata structure for each of the plurality of disjoint regions via the respective region manager(s) of the one or more of the plurality of disjoint regions, each metadata structure comprising metadata indicating a physical storage location of one or more data chunks associated with the respective region; and
   performing, by the computer, a deduplicated write operation of a first data chunk in a first region of the plurality of disjoint regions, wherein the deduplicated write operation comprises:
      consulting, by a first region manager of the first region, a duplicate chunk finder in response to the first region manager receiving a write request corresponding to the first data chunk;
      determining, using at least the duplicate chunk finder, whether one or more of the plurality of disjoint regions other than the first region comprises a second data chunk identical in content to the first data chunk; and
      in response to determining one or more of the plurality of disjoint regions other than the first region comprises the second data chunk, establishing by the first region manager a reference from the first data chunk to the second data chunk.

2. The computer program product as recited in claim 1, wherein each region manager is configured to service one or more of random read and/or random write operations directed to one or more of the plurality of disjoint regions via the respective region manager(s) of the one or more of the plurality of disjoint regions.

3. The computer program product as recited in claim 1, wherein establishing the reference from the first data chunk to the second data chunk involves the region managers of the regions hosting the first data chunk and the second data chunk.

4. The computer program product as recited in claim 1, wherein determining whether the one or more of the plurality of disjoint regions other than the first region comprise the second data chunk is performed further using the respective region managers of the one or more of the plurality of disjoint regions.

5. The computer program product as recited in claim 1, comprising program instructions executable by the computer to cause the computer to receive a confirmation from at least one region manager of the one or more of the plurality of disjoint regions other than the first region that comprise the second data chunk.

6. The computer program product as recited in claim 1, wherein the metadata structure for each region comprises metadata indicating a number of regions having a reference to the one or more data chunks associated with the respective region.

7. The computer program product as recited in claim 1, wherein the metadata structure for each region comprises metadata indicating a number of references to the one or more data chunks associated with the respective region.

8. The computer program product as recited in claim 1, wherein the metadata structure for each region comprises metadata indicating a unique identifier of the one or more data chunks associated with the respective region.

9. The computer program product as recited in claim 8, wherein each unique identifier comprises a 20-byte hash based on content of the corresponding data chunk.

10. The computer program product as recited in claim 1, comprising a virtual namespace map comprising:
    metadata indicating a unique key for each data chunk stored in the namespace; and
    metadata indicating a region to which each data chunk stored in the namespace belongs.

11. The computer program product as recited in claim 1, comprising program instructions configured to cause the computer to perform a deduplicated read operation directed to the namespace.

12. The computer program product as recited in claim 11, wherein the deduplicated read operation comprises, in response to the first region manager receiving a read request corresponding to the deduplicated read operation:
    determining, by the first region manager, whether a reference to the second data chunk exists in the metadata structure of the first region; and
    in response to determining the reference to the second data chunk exists in the metadata structure of the first region, providing access to the second data chunk by a second region manager managing the region hosting the second data chunk.

13. The computer program product as recited in claim 11, wherein the deduplicated read operation comprises, in response to the first region manager receiving a read request corresponding to the deduplicated read operation:
   determining, by the first region manager, whether a reference to the second data chunk exists in the metadata structure of the first region; and
   in response to determining the reference to the second data chunk exists in the metadata structure of the first region, reading by the first region manager the second data chunk.

14. The computer program product as recited in claim 1, wherein establishing the reference to the second data chunk is performed only in response to a first instance of the determining one or more of the plurality of disjoint regions other than the first region comprises the second data chunk.

15. The computer program product as recited in claim 1, comprising program instructions configured to cause the computer to perform a non-deduplicated write of the first data chunk to the first region in response to determining none of the plurality of disjoint regions other than the first region comprises the second data chunk.

16. The computer program product as recited in claim 15, comprising creating a metadata record in the metadata structure of the first region in response to performing the non-deduplicated write of the first data chunk, the metadata record comprising at least a unique identifier corresponding to the first data chunk and a physical storage location corresponding to the first data chunk.

17. The computer program product as recited in claim 1, wherein each data chunk is characterized by a size in a region from about 4 KB to about 16 KB.

18. The computer program product as recited in claim 1, wherein the namespace is implemented on a primary storage system.

19. A computer-implemented method for performing deduplication in conjunction with random read and write operations across a namespace divided into a plurality of disjoint regions, each region of the namespace being managed by a region manager, the method comprising:
   maintaining a metadata structure for each of the plurality of disjoint regions via the respective region manager(s) of the one or more of the plurality of disjoint regions, each metadata structure comprising metadata indicating a physical storage location of one or more data chunks associated with the respective region; and
   performing a deduplicated write operation of a first data chunk in a first region of the plurality of disjoint regions, wherein the deduplicated write operation comprises:
      consulting, by a first region manager of the first region, a duplicate chunk finder in response to the first region manager receiving a write request corresponding to the first data chunk;
      determining, using at least the duplicate chunk finder, whether one or more of the plurality of disjoint regions other than the first region comprises a second data chunk identical in content to the first data chunk; and
      in response to determining one or more of the plurality of disjoint regions other than the first region comprises the second data chunk, establishing by the first region manager a reference from the first data chunk to the second data chunk.

20. A deduplicating storage system configured to perform random read and write operations across a namespace, the system comprising: a processor and logic integrated with and/or executable by the processor, the logic being configured to cause the processor to perform a method comprising:
   maintaining a metadata structure for each of the plurality of disjoint regions via the respective region manager(s) of the one or more of the plurality of disjoint regions, each metadata structure comprising metadata indicating a physical storage location of one or more data chunks associated with the respective region; and
   performing a deduplicated write operation of a first data chunk in a first region of the plurality of disjoint regions, wherein the deduplicated write operation comprises:
      consulting, by a first region manager of the first region, a duplicate chunk finder in response to the first region manager receiving a write request corresponding to the first data chunk;
      determining, using at least the duplicate chunk finder, whether one or more of the plurality of disjoint regions other than the first region comprises a second data chunk identical in content to the first data chunk; and
      in response to determining one or more of the plurality of disjoint regions other than the first region comprises the second data chunk, establishing by the first region manager a reference from the first data chunk to the second data chunk.

* * * * *